(12) United States Patent
Flenker et al.

(10) Patent No.: US 6,192,993 B1
(45) Date of Patent: Feb. 27, 2001

(54) METHOD OF IMPROVING CROP RESIDUE DECAY IN A FIELD

(76) Inventors: William P Flenker, 29476 240th Ave., Long Grove, IA (US) 52756; Kim W. Flenker, 24739 257th St., Princeton, IA (US) 52768; Kevin P. Flenker, 203 W. 1st St., Long Grove, IA (US) 52756

( * ) Notice: Subject to any disclaimer, the term of this patent is extended or adjusted under 35 U.S.C. 154(b) by 0 days.

(21) Appl. No.: 09/340,775

(22) Filed: Jun. 28, 1999

Related U.S. Application Data

(63) Continuation-in-part of application No. 09/003,896, filed on Jan. 7, 1998, now Pat. No. 5,915,481, which is a continuation-in-part of application No. 08/889,488, filed on Jul. 8, 1997, now Pat. No. 5,878,821.

(51) Int. Cl.[7] ....................................................... A01B 5/00
(52) U.S. Cl. ................................. 172/166; 172/454
(58) Field of Search ................................ 172/156, 166, 172/567, 569, 454, 576, 579, 584, 586, 603, 618

(56) References Cited

U.S. PATENT DOCUMENTS

| | | | |
|---|---|---|---|
| 4,211,285 | * 7/1980 | Pajtas | 172/156 |
| 4,403,662 | * 9/1983 | Dietrich, Sr. | 172/156 |
| 5,613,566 | * 3/1997 | Cox et al. | 172/156 X |
| 5,623,997 | * 4/1997 | Rawson et al. | 172/166 X |
| 5,797,460 | * 8/1998 | Parker et al. | 172/166 X |

* cited by examiner

*Primary Examiner*—Robert E. Pezzuto
(74) *Attorney, Agent, or Firm*—Henderson & Sturm LLP

(57) ABSTRACT

A method of improving crop residue decay in a field by providing a tillage implement having a frame and a plurality of tillage tool assemblies operably supported by the frame and adjacently spaced therealong, each of the plurality of tillage tool assemblies having first and second rotatable interlocking members, each of the first and second rotatable interlocking members having first and second tillage tools connected thereto arranged in an opposing angular orientation such that the first and second tillage tools of adjacently spaced tillage tool assemblies are angled outwardly toward one another. Engaging the tillage tools of the implement with the soil of the field and traversing the field with the implement, whereby as the implement traverses the field, adjacently spaced compost rows are formed by the adjacently spaced outwardly angled first and second tillage tools of adjacently spaced tillage tool assemblies mixing and throwing the soil and crop residue therebetween such that the crop residue is thoroughly mixed with the soil in these compost rows thereby improving crop residue decay.

15 Claims, 6 Drawing Sheets

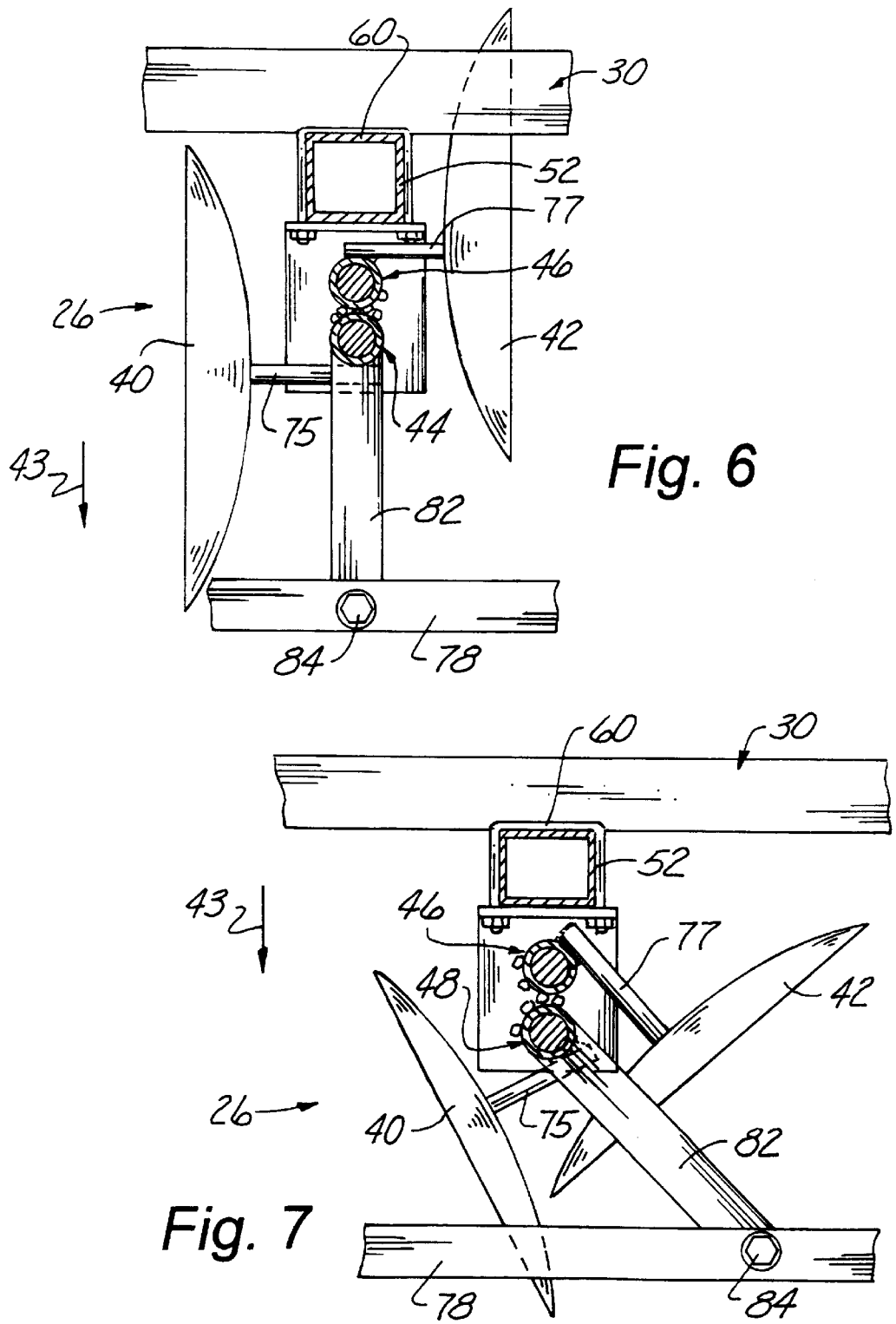

METHOD OF IMPROVING CROP RESIDUE DECAY IN A FIELD

CROSS-REFERENCE TO RELATED APPLICATIONS

This application is a Continuation-in-Part of application Ser. No. 09/003,896 filed Jan. 7, 1998, now U.S. Pat. No. 5,915,481, which is a Continuation-in-Part of application Ser. No. 08/889,488, filed Jul. 8, 1997, now issued as U.S. Pat. No. 5,878,821 on Mar. 9, 1999.

STATEMENT REGARDING FEDERALLY SPONSORED RESEARCH OR DEVELOPMENT

Not Applicable.

BACKGROUND OF THE INVENTION

1. Field of the Invention

This invention relates to a method of improving crop residue decay in a field, and more particularly to a method of improving crop residue decay in a field using a tillage implement to create composting rows.

2. Description of the Related Art

U.S. patent application Ser. No. 09/003,896 and U.S. patent application Ser. No. 08/889,488, by Flenker et al. each disclose tillage tool assemblies which can be mounted adjacent one another on a toolbar of an implement. Each tillage tool assembly is comprised of a first and second tillage tool, for example a disc blade, arranged in an opposing angular orientation such that the first and second disc blades of adjacently spaced tillage tool assemblies are angled outwardly toward one another. As the implement traverses the field, the angular orientation of the tillage tools turn, mix and work the crop residue into the soil and also move the crop residue out of the way of any trailing tillage tools, such as a shanks, chisels, and the like, thereby preventing the trailing tillage tools from becoming entangled with the crop residue.

A particular advantage of the tillage tool assemblies of U.S. patent application Ser. No. 09/003,896 and U.S. patent application Ser. No. 08/889,488 is that the first and second tillage tools, e.g. disc blades, of each tillage tool assembly are angularly adjustable relative to one another and to the direction of travel of the implement. Thus, the amount of crop residue being turned over and worked into the soil can be varied as the implement traverses the field.

During field testing, it was shown that Fall tilling of a corn stubble field using an implement with the tillage tool assemblies of the type disclosed in U.S. patent application Ser. No. 09/003,896 mounted thereon, significantly improved the soybean crop yield on that field the following year and that volunteer corn was significantly reduced. It was determined that the improved crop yield and reduced volunteer corn was a result of the improved composting of the corn crop residue, i.e. improved decay, deterioration or breakdown of the corn crop residue. It should be appreciated that, unlike the adjacently spaced, obliquely angled, single blades of a disk gang of a conventional tillage implement, for example, the two opposing, obliquely angled tillage tools of the tillage tool assemblies of the Flenker et al. inventions work together to throw the crop residue between the adjacently spaced tillage tools to create compost rows as the implement traverses the field. When analyzing the compost rows in the Spring of the year, it was determined that the corn crop residue was more thoroughly mixed with the soil than can be achieved by a conventional tillage implement, such as a tandem disk or chisel plow. Thus, because of the more thorough mixing, more surface area of the corn stubble residue is in contact with the soil, resulting in faster deterioration or decaying of the crop residue.

Based on the results of this field test, it was determined that there is a need in the industry for a method of tilling the soil, whether in the Fall or Spring, to improve crop residue deterioration in a field which will result in increases in crop yield at harvest and a reduction in volunteer crops.

BRIEF SUMMARY OF THE INVENTION

The present invention relates to a method of tilling the soil, to improve crop residue deterioration in a field which will result in increases in crop yield and a reduction in volunteer crops.

The preferred method of improving crop residue deterioration in a field, comprises providing a tillage implement having a frame and a plurality of tillage tool assemblies operably supported by the frame and adjacently spaced therealong, each of the plurality of tillage tool assemblies having first and second rotatable interlocking members, each of the first and second rotatable interlocking members having first and second tillage tools connected thereto arranged in an opposing angular orientation such that the first and second tillage tools of adjacently spaced tillage tool assemblies are angled outwardly toward one another. The method further comprises, engaging the tillage tools of the implement with the soil of the field and traversing the field with the implement, whereby as the implement traverses the field, adjacently spaced compost rows are formed by the adjacently spaced outwardly angled first and second tillage tools of adjacently spaced tillage tool assemblies mixing and throwing the soil and crop residue therebetween such that the crop residue is thoroughly mixed with the soil in these compost rows thereby improving crop residue deterioration.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 6 is a partial cross-sectional top plan view of the tillage tool assembly with the tillage tools oriented substantially in line with the direction of travel of the implement;

FIG. 7 is a partial cross-sectional top plan view of the tillage tool assembly of FIG. 6 with the tillage tools adjusted oblique to the direction of travel of the implement;

DETAILED DESCRIPTION OF THE INVENTION

Figure 1:
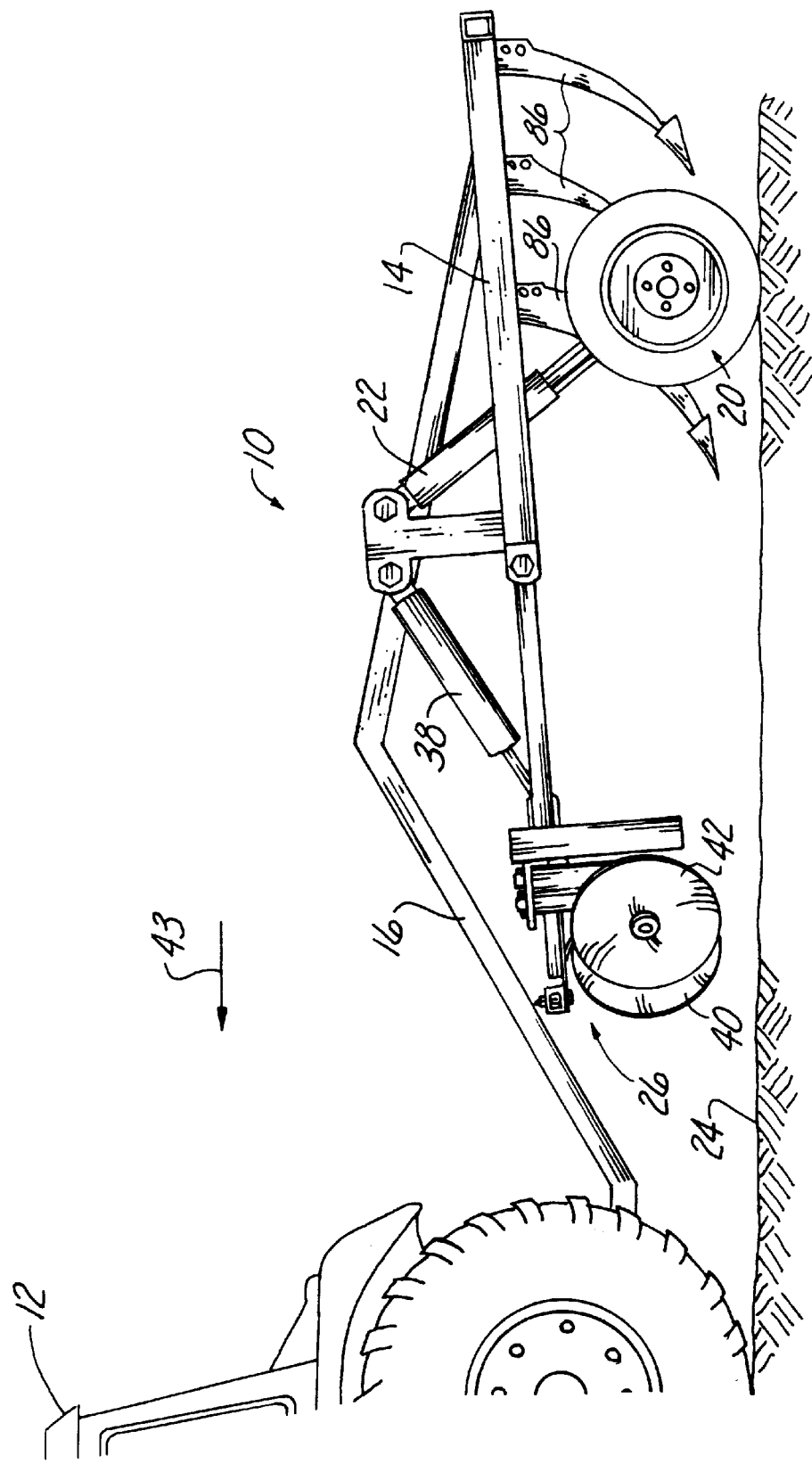
FIG. 1 is a side elevation view of a tillage implement in transport position having the tillage tool assemblies mounted thereon for forming the compost rows.

Referring now to the drawings, wherein like reference numerals designate identical or corresponding parts throughout the several views, FIG. 1 shows a side elevation view of a preferred tillage implement (10) for improving crop residue deterioration or decay in a field. The preferred implement is shown in transport position being towed behind a tractor (12). The implement (10) is comprised of a main frame (14) adapted to be towed by a tractor (12). The main frame (14) includes a tongue (16) for attachment to the drawbar (18) of the tractor (12) (see also FIG. 3).

Figure 2:
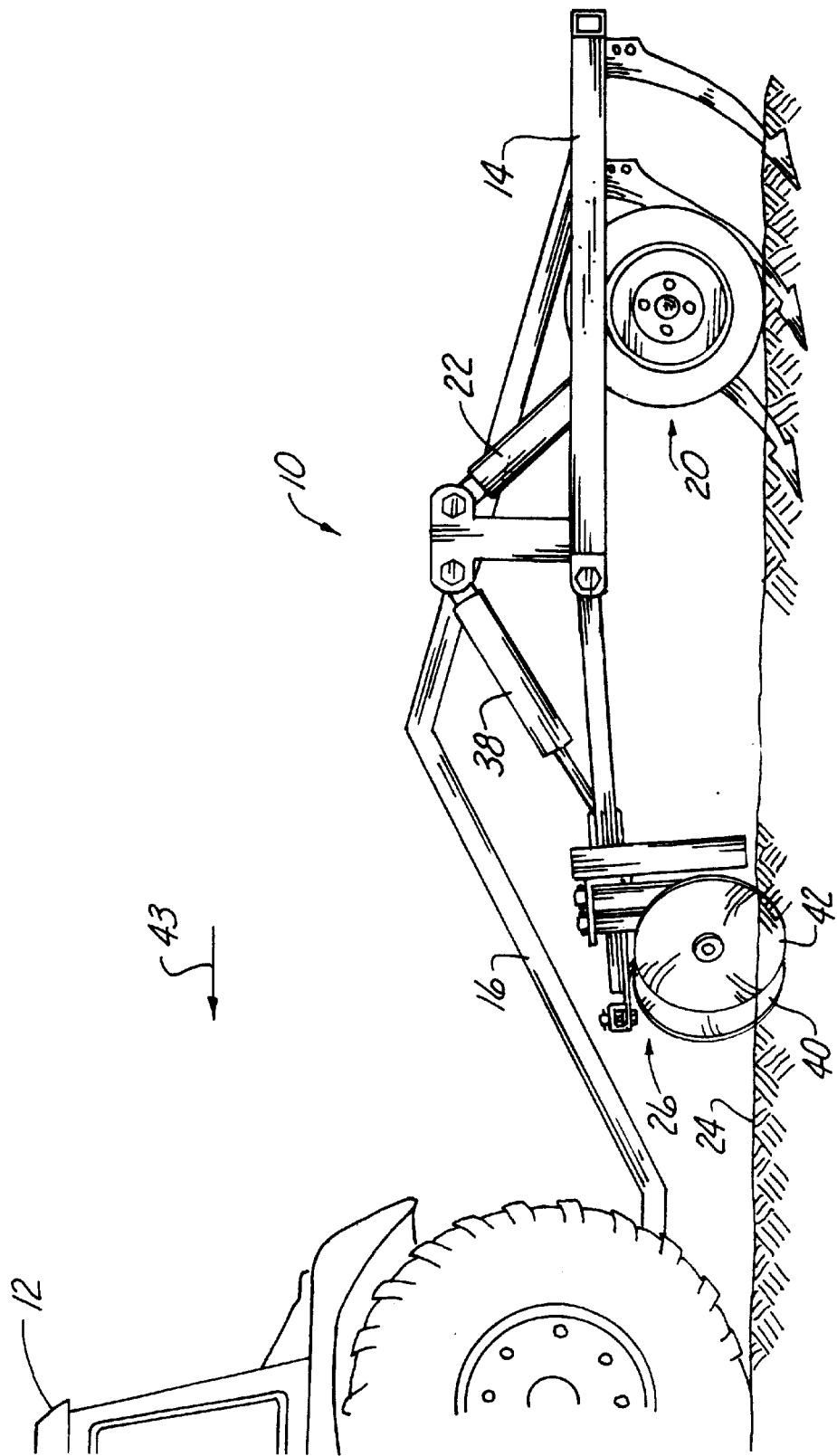
FIG. 2 is a side elevation view of the tillage implement of FIG. 1 in working position.

The implement (10) further includes a pair of ground wheel assemblies (20) which are pivotally attached to the main frame (14). A first actuator (22), such as a hydraulic cylinder, is operably connected to each ground wheel assembly (20) and to the main frame (14). The first actuator (22) acts to pivot the ground wheel assemblies (20) with respect to the main frame (14), thereby raising and lowering the main frame (14) with respect to the ground surface (24) between the transport position (FIG. 1) and the working position (FIG. 2).

The tillage implement (10) further comprises a plurality of tillage tool assemblies (26). The plurality of tillage tool assemblies (26) are preferably adjacently disposed along a support beam (30) pivotally connected to the main frame (14) by support brackets (32) fixed at one end to the support beam (30) and pinned at its other end by pins (34) received by connecting lugs (36) fixed to the main frame (14). A second pair of actuators (38) connected at one end to the main frame (14) and at another end to the support beam (30) act to pivotally raise and lower the support beam (30) with respect to the main frame (14), thereby changing the working depth of the tillage tools (40 and 42) (see FIG. 2).

Figure 3:
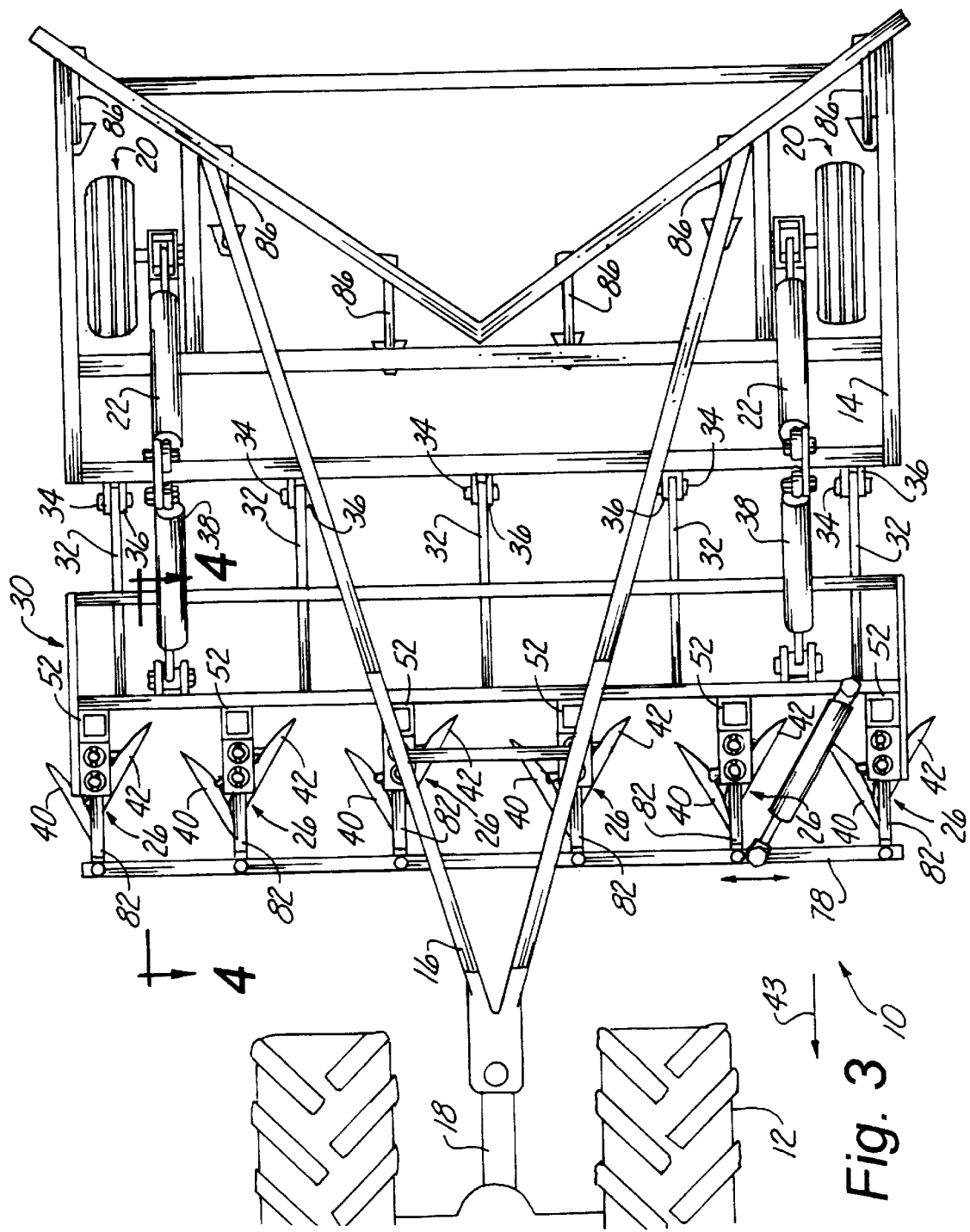
FIG. 3 is a top plan view of the tillage implement of FIG. 2.
Figure 4:
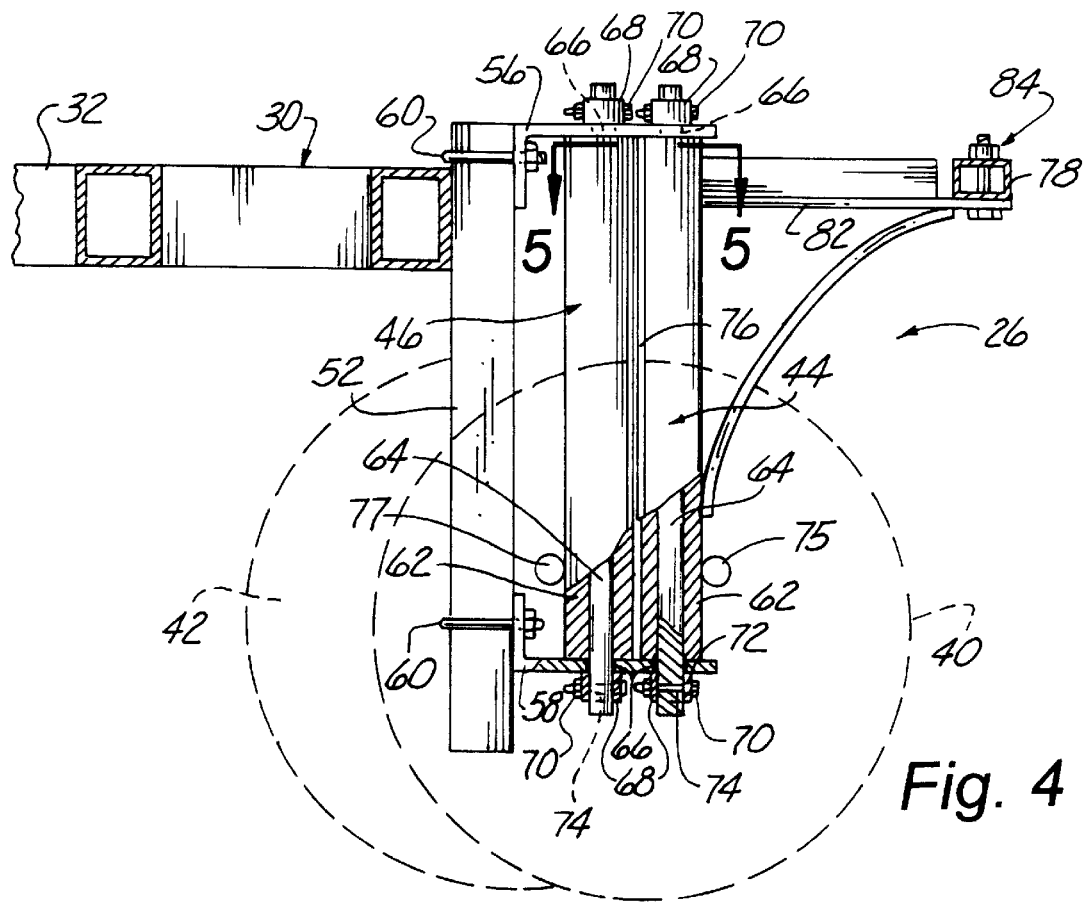
FIG. 4 is a side elevation view of the tillage tool assembly as viewed along lines 4—4 of FIG. 3.
Figure 5:
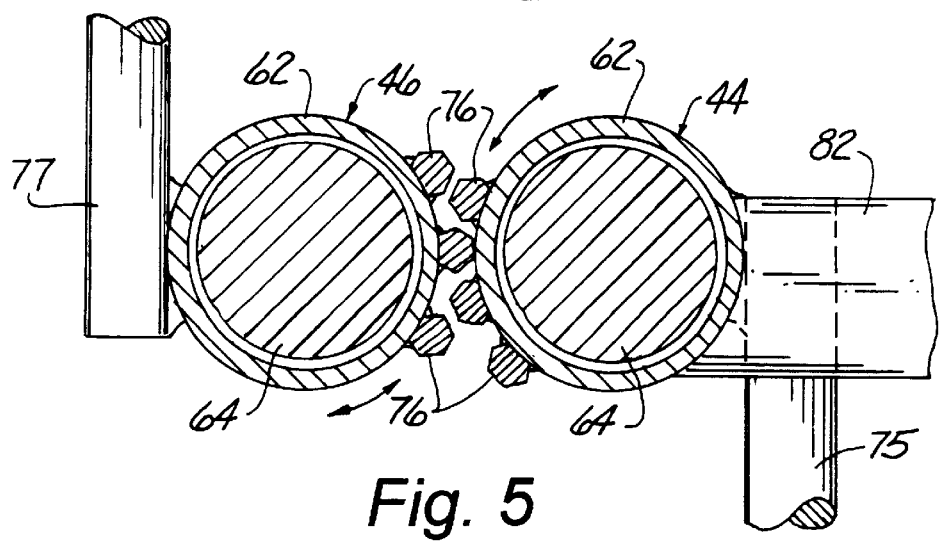
FIG. 5 is a cross-sectional view of the interlocking members of the tillage tool assembly as viewed along lines 5—5 of FIG. 4.
Figure 8:
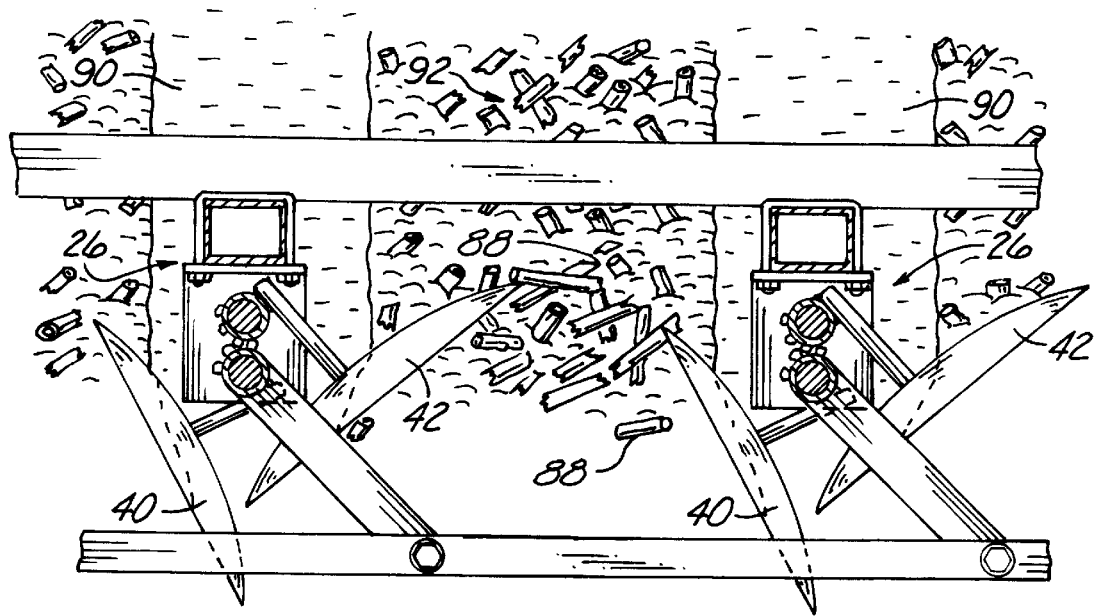
FIG. 8 is a schematic illustration of disc blade type tillage tools in working operation showing formation of the compost rows.
Figure 9:
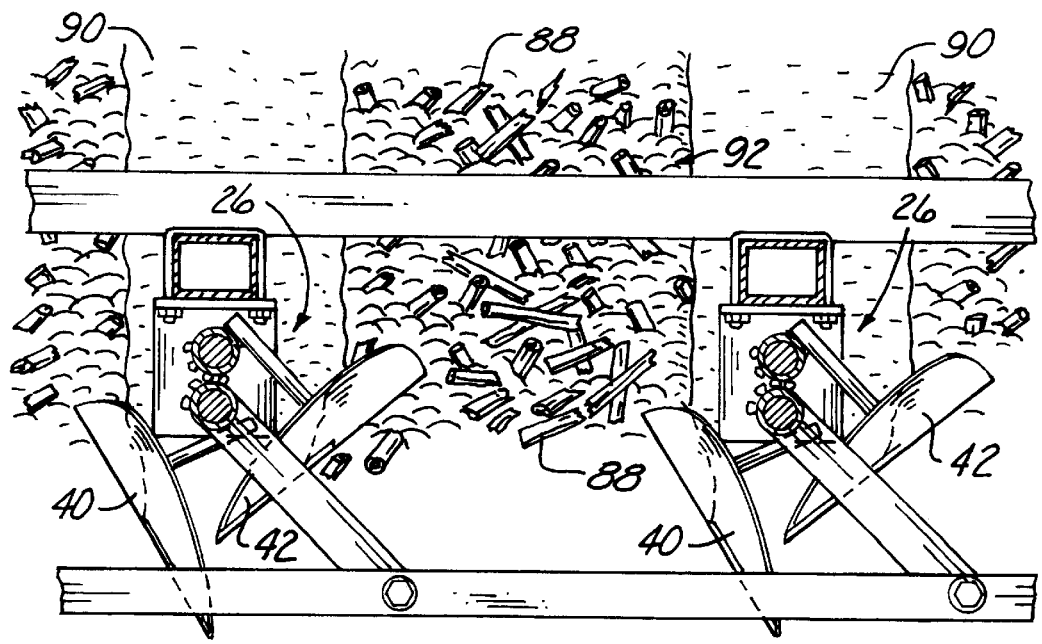
FIG. 9 is a is a schematic illustration of shovel type tillage tools in working operation showing formation of the compost rows.

Each of the tillage tool assemblies (26) has first and second tillage tools (40 and 42) arranged in an opposing angular orientation such that the first and second tillage tools (40, 42) of the adjacently spaced tillage tool assemblies (26) are angled toward one another such that the crop residue (88) is thrown therebetween to form compost rows (92) as shown in FIGS. 8 and 9. It is preferred that the first and second tillage tool assemblies (40, 42) are angularly adjustable relative to one another and to the direction of travel (as designated by arrows (43)) of the tractor (12) and implement (10) (see FIGS. 6 and 7). The angular adjustment of the tillage tools (40 and 42) is accomplished by first and second interlocking members (44 and 46) (best viewed in FIGS. 4 and 5) which are in working relationship with a transverse bar (48) and a third actuator (50) (FIG. 3). FIG. 4 is a side elevation view of the tillage tool assembly (26) as viewed along lines 4—4 of FIG. 3. FIG. 5 is a cross-sectional view of the interlocking members (44 and 46) as viewed along lines 5—5 of FIG. 4. As seen in FIG. 4, a tillage tool assembly support (52) is secured to the support beam (30). The interlocking members (44 and 46) are disposed between upper and lower brackets (56 and 58) that are secured to the vertical support member (52) by U-bolts (60). Each of the interlocking members (44 and 46) are preferably thick walled pipe sleeves (62) which surround a shaft (64). The shafts (64) project through apertures (66) in the upper and lower brackets (56 and 58). Bushings (68) are secured to the upper and lower brackets (56 and 58) for receiving the ends of the shafts (64) projecting therethrough. A threaded fastener (70) extends through apertures (72) in the bushings (68) and apertures (74) in the shaft (64), thereby securing the shaft (64) within the bushings (68). Thus, it should be appreciated that the sleeves (62) of the interlocking members (44 and 46) are free to rotate about the fixed shafts (64).

In the preferred embodiment, the tillage tools (40, 42) are disc blades, but it should be appreciated that other types of tillage tools, such as sweeps, chisels, drills, blades, or the like (collectively and/or individually referred to hereinafter as shovels), may also be used as illustrated in FIG. 9. The disc blade tillage tools (40, 42) are rotatably supported by first and second shafts (75 and 77) rigidly fixed to the first and second interlocking members (44 and 46), preferably by welding, as shown in FIGS. 4 and 5. Naturally if the disc blade tillage tools are replaced by shovel type tillage tools or the like, the shovels would not be rotatably mounted. Rather, the shovels (40, 42) would be rigidly fixed to the first and second shafts (75, 77) such as by a bolted connection (not shown).

As best viewed in FIG. 5, hex shaped rods (76) are welded to the lengths of opposing outer peripheries of the sleeves (62) of the interlocking members (44 and 46) such that the rods (76) are disposed in interlocking engagement. It will be appreciated that rotation of the first interlocking member (44) will cause subsequent rotation of the second interlocking member (46) due to the interlocking engagement of the opposing rods (76) (sec FIGS. 6 and 7).

Referring now to FIG. 3 in conjunction with FIG. 4, it can be seen that a transverse bar (78) extends the width of the implement (10). The third actuator (50) (FIG. 3) is connected at one end to the disc gang support beam (30) (thus operably to the main frame (14)) and at its other end to the transverse bar (78). Linking members (82) pivotally connect the transverse bar (78) to the first interlocking member (44). As best viewed in FIG. 4, a pinned connection (84) pivotally secures the transverse bar (78) to the linking member (82). Actuation of the third actuator (50) moves the transverse bar (78) transverse to the direction of travel of the implement (10) (designated by arrow (43)), thereby causing rotation of the first and second interlocking members (44 and 46) connected thereto by the link (82), thereby changing the angular orientation of the first and second tillage tools (40 and 42) (see FIGS. 6 and 7) of the tillage tool assemblies (26).

The main frame (14) of the tillage implement (10) may further support a plurality of trailing tillage tools (86) such as shanks, rippers, chisels, etc. The trailing tillage tools (86) are preferably arranged in a V-shaped formation for easier pulling and maximum crop residue flow-through. Each of the trailing tillage tools (86) are preferably positioned rearwardly and longitudinally in line with one of the plurality of tillage tool assemblies (26). As illustrated in FIGS. 8 or 9, positioning the trailing tillage tools (86) rearwardly and longitudinally in line with the tillage tool assemblies (26) prevents plugging of the trailing tillage tools (86) because the tillage tools (40 and 42) throw the crop residue (88) to either side creating a substantially clean shallow trench (90) as the implement (10) traverses the field. Furthermore, in addition to creating the shallow trench (90) the crop residue (88) is thrown between the adjacent tillage tool assemblies (26) to form compost rows (92). In the compost rows (92) the crop residue (88) is more thoroughly mixed with the soil than can be achieved by a conventional tillage implement, such as a tandem disk or chisel plow. Thus, because of the more thorough mixing, more surface area of the crop residue (88) is in contact with the soil, resulting in faster deterioration or decaying of the crop residue (88).

In operation, the implement (10) is lowered from the transport position (FIG. 1) to the working position (FIG. 2), by actuation of the first actuators (22). The depth of penetration of the trailing tillage tools (86) into the soil surface (24) is thereby controlled by the lowering of the main frame (14) with the first actuators (22). The depth of penetration of the tillage tools (40 and 42) into the soil surface (24) is further controlled by actuation of the second actuators (38) which act to pivotally raise and lower the entire support beam (30) with respect to the main frame (14) about pivot pins (34). In the preferred embodiment, depending on the percentage of crop residue (88) and the soil conditions of the field, the angular orientation of the tillage tools (40 and 42) can be changed from a substantially in line position with the direction of travel as shown in FIG. 6 to an extreme oblique angle from the direction of travel as shown in FIG. 7 while on-the-go by actuation of the third actuator (50). It should be appreciated that altering the oblique angle of the tillage tools (40 and 42) while the implement (10) is in working position and on-the-go, enables the farmer to vary the amount of crop residue left on the surface of the soil as field conditions and surface crop residue requirements change.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. A method of improving crop residue decay in a field, said method comprising:
    (a) providing a tillage implement having a frame and a plurality of tillage tool assemblies operably supported by said frame and adjacently spaced therealong, each of said tillage tool assemblies having first and second tillage tools arranged in an opposing angular orientation such that said first and second tillage tools of adjacently spaced tillage tool assemblies are angled outwardly toward one another;
    (b) engaging said tillage tools of the implement with the soil of the field and traversing the field with said implement prior to sowing crop seeds, such that as said implement traverses the field, adjacently spaced compost rows are formed by said adjacently spaced outwardly angled first and second tillage tools of adjacently spaced tillage tool assemblies mixing and throwing the soil and crop residue therebetween such that the crop residue is thoroughly mixed with the soil in these compost rows thereby improving crop residue decay.

2. The method of claim 1 wherein said first and second tillage tools of said tillage tool assemblies are angularly adjustable relative to one another and to the direction of travel of the implement.

3. The method of claim 1 wherein said first and second tillage tools include disc blades.

4. The method of claim 1 wherein said first and second tillage tools include shovels.

5. A method of improving crop residue decay in a field, said method comprising:
    (a) providing a tillage implement having a frame and a plurality of tillage tool assemblies operably supported by said frame and adjacently spaced therealong, each of said plurality of tillage tool assemblies having first and second rotatable interlocking members, each of said first and second rotatable interlocking members having first and second tillage tools connected thereto arranged in an opposing angular orientation such that said first and second tillage tools of adjacently spaced tillage tool assemblies are angled outwardly toward one another, and wherein said tillage tools are angularly adjustable relative to one another and to the direction of travel of the implement;
    (b) engaging said tillage tools of the implement with the soil of the field and traversing the field with said implement prior to sowing crop seeds, such that as said implement traverses the field, adjacently spaced compost rows are formed by said adjacently spaced outwardly angled first and second tillage tools of adjacently spaced tillage tool assemblies mixing and throwing the soil and crop residue therebetween such that the crop residue is thoroughly mixed with the soil in these compost rows thereby improving crop residue decay.

6. The method of claim 5 wherein said first and second tillage tools include disc blades.

7. The method of claim 5 wherein said first and second tillage tools include shovels.

8. A method of forming compost rows of soil and crop residue in a field, said method comprising:
    (a) providing a tillage implement having a frame and a plurality of tillage tool assemblies operably supported by said frame and adjacently spaced therealong, each of said tillage tool assemblies having first and second tillage tools arranged in an opposing angular orientation such that said first and second tillage tools of adjacently spaced tillage tool assemblies are angled outwardly toward one another;
    (b) engaging and traversing a field with said implement after harvesting a crop and prior to sowing another crop, such that as said implement traverses the field, adjacently spaced compost rows of soil and crop residue are formed by said adjacently spaced outwardly angled first and second tillage tools of adjacently spaced tillage tool assemblies mixing and throwing said soil and said crop residue therebetween such that said crop residue is thoroughly mixed with said soil in said compost rows thereby improving decay of said crop residue prior to sowing said another crop.

9. The method of claim 8 wherein said first and second tillage tools of said tillage tool assemblies are angularly adjustable relative to one another and to the direction of travel of the implement.

10. The method of claim 8 wherein said first and second tillage tools include disc blades.

11. The method of claim 8 wherein said first and second tillage tools include shovels.

12. The method of claim 9 wherein each of said plurality of tillage tool assemblies further comprises first and second rotatable interlocking members, each of said first and second rotatable interlocking members operably supporting said first and second angularly adjustable tillage tools.

13. The method of claim 12 further comprising:
    (c) while on the go, rotating said first rotatable interlocking member thereby causing subsequent rotation of said second rotatable interlocking member, such that rotation of said first and second rotatable interlocking members adjusts said angular orientation of said first and second tillage tools relative to one another and to the direction of travel of the implement while on the go.

14. The method of claim 13 wherein said first and second tillage tools include disc blades.

15. The method of claim 13 wherein said first and second tillage tools include shovels.

\* \* \* \* \*